(12) United States Patent
Reale

(10) Patent No.: US 11,356,732 B2
(45) Date of Patent: Jun. 7, 2022

(54) TRACKING USER ENGAGEMENT ON A MOBILE DEVICE

(71) Applicant: NBCUNIVERSAL MEDIA, LLC, Universal City, CA (US)

(72) Inventor: Jeffrey J. Reale, New York, NY (US)

(73) Assignee: NBCUNIVERSAL MEDIA, LLC, Universal City, CA (US)

( * ) Notice: Subject to any disclaimer, the term of this patent is extended or adjusted under 35 U.S.C. 154(b) by 481 days.

(21) Appl. No.: 16/151,250

(22) Filed: Oct. 3, 2018

(65) Prior Publication Data
US 2020/0112766 A1 Apr. 9, 2020

(51) Int. Cl.
*H04N 21/442* (2011.01)
*H04N 21/81* (2011.01)
*H04W 4/02* (2018.01)
*H04M 1/72454* (2021.01)

(52) U.S. Cl.
CPC .. *H04N 21/44204* (2013.01); *H04M 1/72454* (2021.01); *H04N 21/44218* (2013.01); *H04N 21/812* (2013.01); *H04W 4/02* (2013.01); *H04M 2250/12* (2013.01)

(58) Field of Classification Search
None
See application file for complete search history.

(56) References Cited

U.S. PATENT DOCUMENTS

| | | | | |
|---|---|---|---|---|
| 2012/0041825 A1* | 2/2012 | Kasargod | ............... | G06Q 30/02 705/14.68 |
| 2013/0205314 A1* | 8/2013 | Ramaswamy | ... | H04N 21/44218 725/14 |
| 2014/0210702 A1* | 7/2014 | Peterson | ................. | G06F 3/013 345/156 |
| 2014/0259034 A1* | 9/2014 | Terrazas | ............ | H04N 21/4126 725/12 |
| 2015/0112796 A1* | 4/2015 | Greenzeiger | ...... | G06Q 30/0251 705/14.49 |
| 2015/0149179 A1* | 5/2015 | Korbecki | ................ | G10L 13/00 704/260 |
| 2019/0228439 A1* | 7/2019 | Anthony | ............ | G06Q 30/0202 |

OTHER PUBLICATIONS

European Patent Office Application Serial No. 19201196.3, Office Action dated Apr. 7, 2022, 4 pages.

* cited by examiner

*Primary Examiner* — Junior O Mendoza
(74) *Attorney, Agent, or Firm* — Lee, Hong, Degerman, Kang & Waimey PC

(57) ABSTRACT

Systems and methods for determining a comparative level of user engagement are disclosed. According to at least one embodiment, a method of determining a comparative level of user engagement with content of a first type includes receiving sensor data (e.g., rotational vector, attitude, or ambient light sensor data) from a mobile device. The sensor data includes first sensor data sensed by the mobile device during display of the content of the first type at the device, and second sensor data sensed by the mobile device during display of content of a second type at the device. The method may include determining the comparative level of user engagement with the content of the first type based on the first and second sensor data, selecting additional content based on the determined comparative level of user engagement, and transmitting the selected additional content to the mobile device for output by the mobile device.

19 Claims, 7 Drawing Sheets

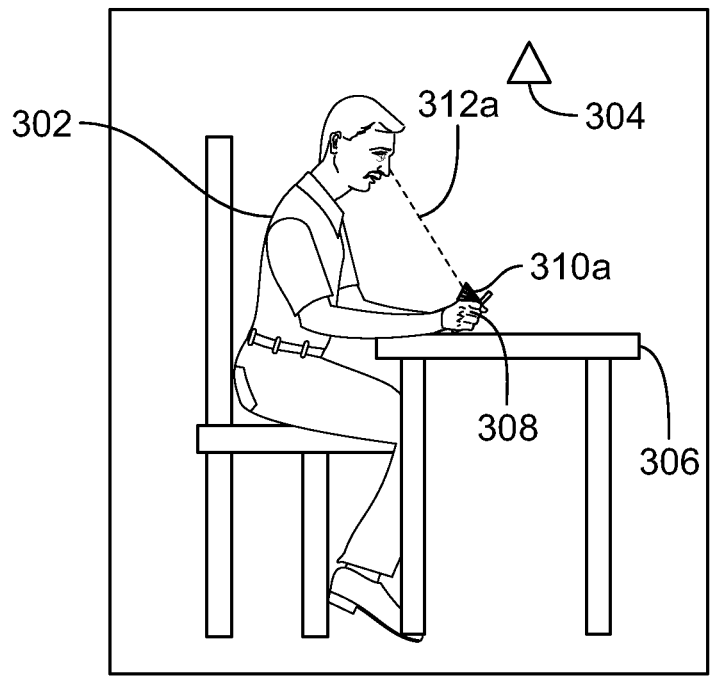
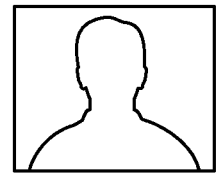
Light Sensor Perspective
30 lx
FIG. 3A
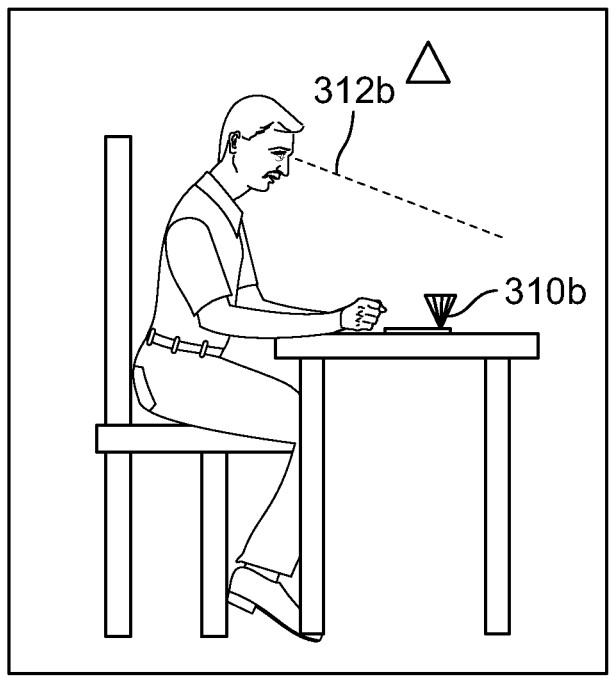
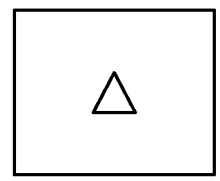
Light Sensor Perspective
210 lx
FIG. 3B

500

502 — Receive Sensor Data from a Mobile Device

504 — Segment First Sensor Data Based on Third Sensor Data

506 — Segment Second Sensor Data Based on Third Sensor Data

508 — Determine the Comparative Level of User Engagement with Content of the First Type, Based on the First Sensor Data and the Second Sensor Data 510 — Select Additional Content Based on the Determined Comparative Level of User Engagement 512 — Transmit the Selected Additional Content to the Mobile Device

FIG. 5

TRACKING USER ENGAGEMENT ON A MOBILE DEVICE

BACKGROUND

Various types of content (e.g., audio, video, and/or gaming content) may be provided to a mobile device for presentation at the mobile device. The mobile device may be a device such as a tablet computer device or a mobile telephone (e.g., smartphone).

For example, user-selected content such as videos, episodic programs, and movies may be provided for display at the mobile device. Such content may be provided, for example, by an on-demand video service or provider.

The providing of such content may be monetized by, for example, providing advertisement content to the mobile device for presentation at the mobile device. The advertisement content may be presented at certain times, e.g., at a time immediately preceding a presentation of the user-selected content, or at one or more particular breaks (e.g., predefined breaks) during the presentation of the user-selected content.

SUMMARY

In at least some situations, content providers have little to no visibility as to whether a particular user engages with content (e.g., advertisement content) presented at the user's mobile device. For example, providers may have little feedback as to whether the engagement level of the user with respect to the advertisement content is similar to or different from the engagement level of the user with respect to user-selected content. It is possible that the user actively engages with (e.g., watches) the user-selected content, but chooses to engage with the advertisement content to a lesser degree. For example, the user may choose to ignore advertisement content (or other content provider selected content) that is presented at the user's mobile device.

According to at least one embodiment, a method of determining a comparative level of user engagement with content of a first type includes receiving sensor data from a mobile device. The sensor data includes first sensor data sensed by the mobile device during display of the content of the first type at the mobile device, and second sensor data sensed by the mobile device during display of content of a second type at the mobile device. The method further includes determining the comparative level of user engagement with the content of the first type based on the first sensor data and the second sensor data, selecting additional content based on the determined comparative level of user engagement, and transmitting the selected additional content to the mobile device for output by the mobile device.

In another embodiment of the present invention, a content server may include a network communication unit configured to transmit and receive data, and one or more controllers configured to control the network communication unit to receive sensor data from a mobile device. The sensor data includes first sensor data sensed by the mobile device during display of the content of the first type at the mobile device, and second sensor data sensed by the mobile device during display of content of a second type at the mobile device. The one or more controllers are further configure to: determine the comparative level of user engagement with the content of the first type based on the first sensor data and the second sensor data; select additional content based on the determined comparative level of user engagement; and control the network communication unit to transmit the selected additional content to the mobile device for output by the mobile device.

BRIEF DESCRIPTION OF THE DRAWINGS

The above and other aspects and features of the present disclosure will become more apparent upon consideration of the following description of embodiments, taken in conjunction with the accompanying drawing figures.

FIGS. 3A and 3B illustrate examples of situations in which ambient light sensor data may be used according to at least one embodiment.

FIG. 5 is a flowchart illustrating a method of determining a comparative level of user engagement according to at least one embodiment.

DETAILED DESCRIPTION

In the following detailed description, reference is made to the accompanying drawing figures which form a part hereof, and which show by way of illustration specific embodiments of the present invention. It is to be understood by those of ordinary skill in the technological field of content management and delivery that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for determining a comparative level of user engagement with respect to content of different types. In this disclosure, the content will be discussed primarily with respect to content generated for distribution via mobile and data transmission protocols. The term "distribution" will be used broadly to include various delivery methods of content, including air, cable, satellite, Internet, wireless, and other platforms known in the art, and shall not be limited to a particular technology or platform. One of ordinary skill in the art will appreciate that this disclosure is not to be limited to this list, or the following discussion, and is applicable to various other formats, medium, platforms, and distribution channels known to those skilled in the art.

Embodiments are directed to determining a comparative level of user engagement with content of a particular type, e.g., in relation to user engagement with content of another type.

By way of example, advertisement content may be provided to a user's mobile device for presentation at the mobile device. The advertisement content may be provided along with other content (e.g., user-selected content). In selecting content that is to be provided to the mobile device, it may be helpful to have information regarding a type (or types) of content that are likely to attract (or not attract) the attention of the user. Such information may be especially helpful with regards to advertisement content that requests interaction (e.g., manual interaction, voice interaction) by the user.

According to at least one embodiment, a comparative level of user engagement with content of a particular type is determined. The determination may be based on sensor data received from a user's mobile device.

Figure 1:
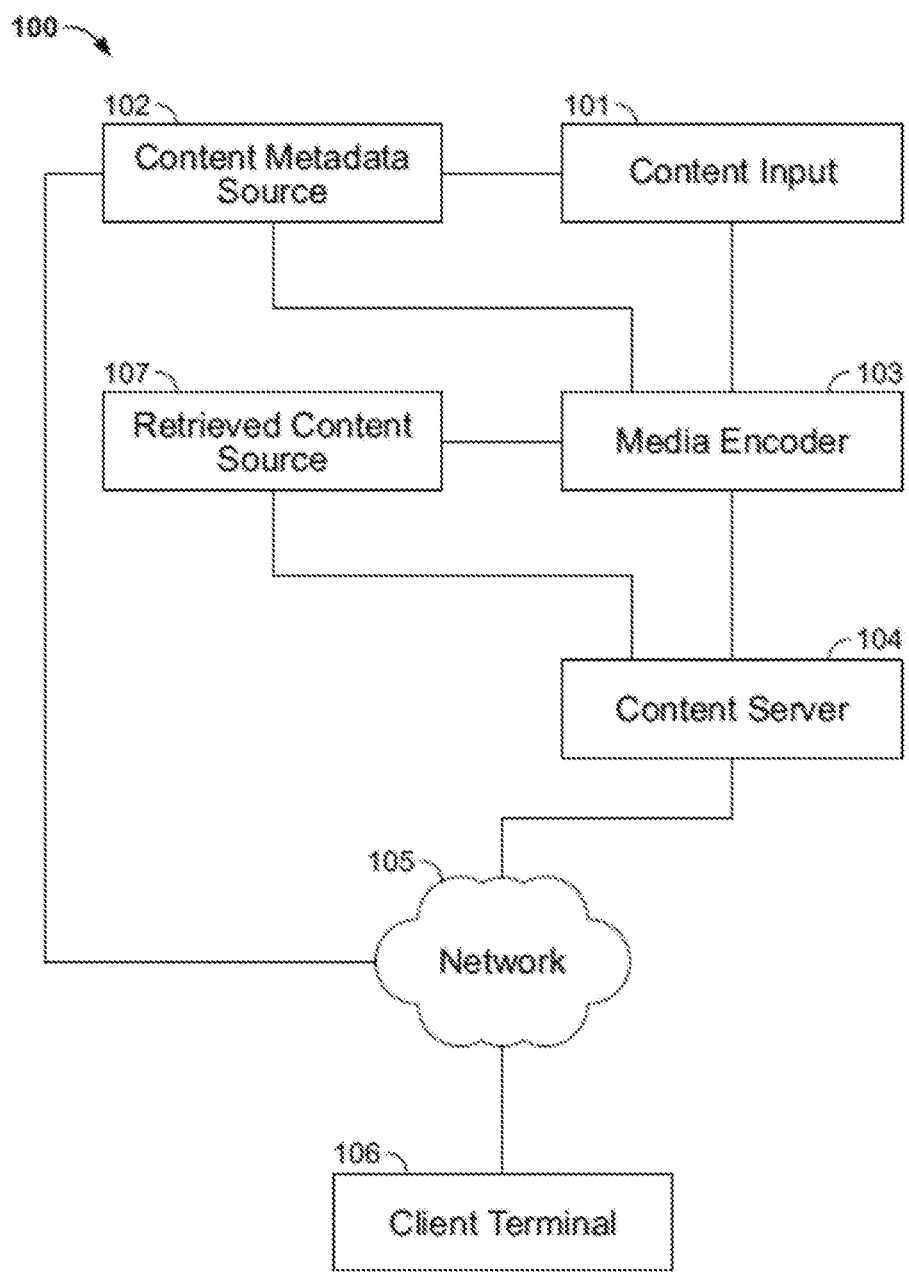
FIG. 1 is an illustration of a system for a system for determining a comparative level of user engagement according to at least one embodiment.

Referring to FIG. 1, a system 100 for determining a comparative level of user engagement is illustrated. The system 100 may be configured to generate, encode, distribute, and/or store audio and/or video content, as well as receive and handle requests from a client terminal for presentation of the content. FIG. 1 will be discussed with respect to content that is suitable for delivery by streaming, etc. However, this disclosure is not to be limited thereto, and it will be understood by those of ordinary skill in the art that the features discussed herein are applicable to numerous other applications, platforms, and content delivery methods well known by those of ordinary skill in the art.

The system 100 may include a content input 101 in which content is created and/or generated for encoding and distribution. At the content input 101, a particular piece of content may be captured and/or uploaded. According to other embodiments of the system 100, the content may be otherwise provided from various sources including video (e.g., television broadcast, cable video distribution systems, satellite content distribution, Internet video, streaming video, mobile video distribution systems, digital video downloads, etc.). For purposes of brevity, examples of the content will be described herein mostly with respect to non-advertisement content or advertisement content that is uploaded. However, it is understood that other types of content may be utilized. For example, although embodiments are described herein with reference to video content, it is understood that non-video or text-based content (such as interactive gaming, articles, ebooks, etc.) may be utilized.

The embodiment of the system 100 may further include a content metadata source 102, which creates, gathers, compiles, and/or provides metadata related to the content for compilation and incorporation with the distributed content. For example, the metadata may describe thematic elements, underlying subject matter, and other data.

In the system 100, the content metadata source 102 and the content input 101 may be coupled to a media encoder 103, which is configured to encode the content, along with encoded metadata of the content. The encoded files are then made available for streaming download (e.g., via an on-demand delivery system).

In some embodiments, the encoded files may correspond to commonly known compressed or uncompressed file formats including MPEG-1, MPEG-2, MPEG-4, H.264, AVC, DV, DVCAM, AVI, ASF, MOV, WMV, etc. However, it is understood that this disclosure is not limited thereto, and that numerous other compressions and formats may be utilized. The encoder may encode content and cause the generated encoded files to be distributed by a content server 104.

The media encoder 103 may also be configured to cause encoded media files to be concurrently stored in a memory associated with the content server 104. In some embodiments the media encoder 103 may also be configured to provide the encoded media files to a retrieved content source 107 where it may be stored for retrieval. In other embodiments, the encoded media files may be stored in a database external to the system, and the content server 104 or the retrieved content source 107 may be configured to store pointers or path descriptions for querying and/or requesting the encoded media files from the external database for later retrieval.

According to at least one embodiment, the encoded media files may be stored in the retrieved content source 107 along with metadata associated with the media files, including encoding metadata, closed captioning information, etc. In some embodiments, the retrieved content source 107 may also receive metadata directly from content metadata source 102, for association and storage with the encoded media files.

Returning to the content server 104 of the system 100, the content server 104 may include a plurality of content servers, each configured to handle requests for media files and to facilitate transmission of media files to requesting parties. As illustrated in FIG. 1, the content server 104 may be in communication with a client terminal 106 via a network 105.

The content server 104 may be configured to receive requests from the client terminal 106 for media content, and provide information to the client terminal 106 in response to the request. The information may include data associated with the encoded media content or address information for retrieving files of the encoded media content. It will be understood that content server 104 may be configured to provide information, data, and media content other than video, including audio, text, metadata, etc.

For example, content server 104 may be an enterprise server, a web server, a media server, a mobile data server, or any other type of server. In some embodiments, the content server 104 may be a computer or a computer program responsible for accepting requests (e.g., HTTP, RTSP, or other protocols that can initiate a media session) from client terminal 106 and serving client terminal 106 with streaming media. Although not shown in FIG. 1, embodiments are considered in which the client terminal 106 is configured to transmit and receive data directly to and from a separate web server, which in turn transmits and receives data transmissions to and from the content server 104 via a network such as the network 105.

In some embodiments, the content server 104 may be configured to provide the client terminal 106 with one or more manifest data files which include information related to the encoded media content. The manifest data file may be provided to the client terminal 106 in response to a request for encoded media content. The manifest may include information on suggested bandwidths for each encoding level, a location where each encoding data file is available such as an address, link, or other pointer to a location where the encoding file can be retrieved, and various metadata related to the encoded media content, such as event information, media type, aspect ratios, codec information, and the like. In some embodiments, the manifest may be provided in the form of an XML file. However, various implementations and file types which are well known to those of ordinary skill in the art are considered.

The network 105 may include various systems for distribution of content including any desired combination of hardwired and wireless communication links, including wide area networks (WAN), local area networks (LAN), wireless networks suitable for packet-type communications, over-the-air, cable, Internet, other network connection systems, etc., which implement networks and hardware known and used in the related art, including broadcast technologies, cable or satellite distribution systems, Internet protocol (IP), or other networked technologies, etc. Examples of the content include live and recorded television, movies, Internet streaming video and audio, music, radio or other audio-visual content, and the like. The system 100 may also include a gateway (not depicted), for example, a server, a router, a firewall server, a host, a proxy server, request redirector, etc.

The client terminal 106 may be connected to the network 105. The client terminal 106 may be a hardware component including software code and applications that are configured to allow the client terminal to communicate, transmit, request, and receive data packets, which may correspond to streaming media data, via the network 105. The client terminal 106 may include any terminal or system configured to receive a content signal, and, in some embodiments, the client terminal 106 may be configured to decode received encoded media files and prepare the content for presentation to a user via an output device such as a display. The output device may be implemented in the same hardware as the client terminal 106, or, in some embodiments, the output device may be implemented in a separate hardware or location from the client terminal 106 and be otherwise coupled and/or associated with the client terminal, such as by wired connection or wireless communication.

For example, the client terminal 106 may correspond to an Internet video streaming device, which is configured to request, transmit, and receive data packets corresponding to Internet streaming video, and the client terminal may be further configured to decode received data packets and prepare the media content to be displayed via a separate output, such as a television. In some embodiments, the client terminal 106 may also be configured to transmit information to one or more other aspects of the system 100 via the network 105, or similar network, regarding the content data received and decoded by the client terminal 106. Various other embodiments of the client terminal 106 may include televisions, desktop computers, laptop computers, tablet computers, mobile smartphones, personal media devices, wearable devices, set top box receivers, streaming Internet content devices, satellite television receivers, etc. In other embodiments, the client terminal 106 may be implemented in more than one connected device.

In an embodiment, the client terminal 106 may request, retrieve, and/or receive particular content from the content server 104 via the network 105. The request, retrieval, and/or the receiving of the particular content may correspond to a user of a client terminal selecting a particular piece(s) of content, entering a particular URL or address at the client terminal, or utilizing a content provider-specific application that is configured to connect to the content server 104 to transmit and receive instructions or requests for retrieval of specific content items. In some embodiments, the content server 104 may be configured to provide client terminal 106 with a single or multiple encoding streams of information, including audio/video content, as well as data associated with the audio/video content, such as metadata.

In situations where a client terminal (e.g., client terminal 106) is a mobile device (e.g., a tablet computing device, or a mobile telephone such as a smartphone), the relatively small size of the client terminal enables a user to re-position and/or re-orient the client terminal relatively quickly.

At one moment, the user may position the client terminal such that a display (e.g., a screen or a touchscreen) of the terminal is at a location in front of the user's face. For example, the display may be positioned directly in front of the user's face, such that it is directly in the user's line-of-sight. Shortly thereafter, the user may position the client terminal elsewhere (e.g., on a surface of an object within reach of the user, such as a table, a desk, a shelf, etc.), such that the display is no longer directly in the user's line-of-sight. Shortly thereafter, the user may return the client terminal to a location in front of the user's face. As such, the positioning of the display with respect to a user's line-of-sight may not be fixed. Rather, it may change over time.

According to various embodiments, a comparative positioning of a terminal is determined based on data measured by one or more particular sensors of the terminal. The chosen sensor data (e.g., differences in or between the chosen sensor data) may be indicative of differences in the positioning of the terminal. In turn, the positional differences may be indicative of certain behavioral characteristics of a user over time. Examples of such characteristics will be described with reference to situations illustrated in FIGS. 2A and 2B.

Figure 2A:
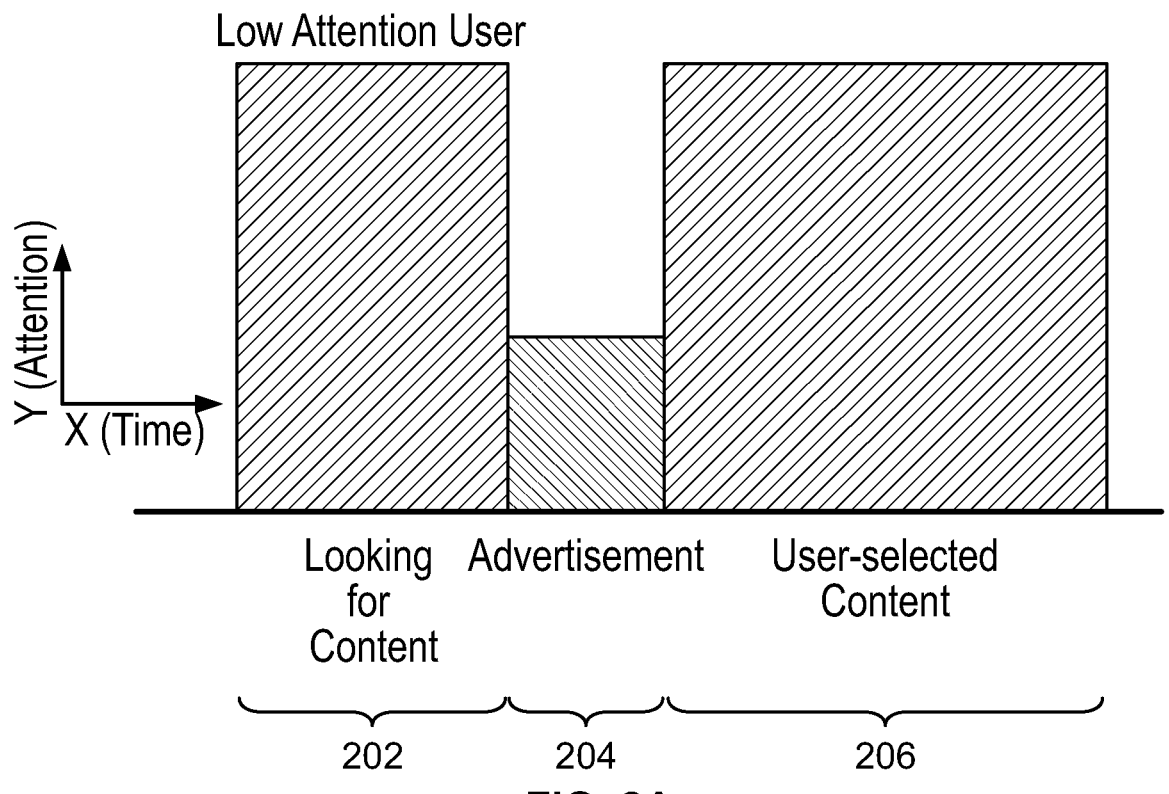
FIGS. 2A and 2B illustrate examples of user engagement levels in hypothetical situations.

FIG. 2A illustrates behavioral characteristics of a user who operates a terminal. The user tends to engage at a higher degree with (e.g., pay more attention to) what is displayed at the terminal during certain periods (e.g., when the user is actively searching for media content to select for display, when the user-selected content is being displayed, etc.). However, the user may engage at a lesser degree with (e.g., pay less attention to) what is displayed at the terminal during other periods (e.g., when the user is not actively searching for media content to select for display, when content other than user-selected content is being displayed, etc.)

With reference to the x-axis of FIG. 2A, three separate time periods are illustrated. During the period 202, the user is actively searching for media content to select for display. Period 202 is followed by period 204. During the period 204, the terminal has not yet begun displaying content that was selected by the user in the period 202. Rather, the terminal displays advertisement content. Period 204 is followed by period 206. During the period 206, the display of the advertisement content has ceased. The terminal displays the content that was selected by the user.

With respect to the y-axis of FIG. 2A, average attention levels (e.g., averages of attention levels that are determined according to embodiments of this disclosure) are illustrated. As illustrated in FIG. 2A, the average attention levels significantly vary between the periods 202 and 204. Also, the average attention levels significantly vary between the periods 204 and 206. During the period 202, the attention levels have relatively high values (e.g., values higher than a particular threshold). As described earlier regarding the period 202, the user is actively searching for media content to select for display. Accordingly, it may be determined that the attention levels have relatively high values correlating with the user being engaged with what is displayed at the terminal.

During the period 204, the attention levels have significantly lower values (e.g., with respect to the values of period 202). For example, the values may be lower than a particular threshold. As described earlier regarding the period 204, the terminal displays advertisement content. Based, for example, on significant difference(s) in corresponding values of sensor data, it may be determined that the positioning and/or orientation of the terminal has changed (e.g., from what it was during the period 202). Based on this conclusion, it may be determined that the attention levels have relatively low values correlating with the user not being engaged with what is displayed at the terminal.

During the period 206, the attention levels have significantly higher values (e.g., as compared to the values of period 204). For example, the values may be higher than a particular threshold. As described earlier regarding the period 206, the terminal displays the content that was selected by the user. Based, for example, on significant difference(s) in corresponding values of sensor data, it is determined that the positioning and/or orientation of the terminal has changed (e.g., from what it was during the period 204). Based on this conclusion, it may be determined that the attention levels have relatively high values correlating with the user being engaged with what is displayed at the terminal.

According to various embodiments, a significant change (e.g., increase or decrease) in the values of the sensor data is interpreted as being indicative of a significant change in the positioning and/or orientation of the terminal, e.g., with respect to a user's line-of-sight. For example, a significant increase in the values of the sensor data during the period 206 relative to the values of the sensor data during the period 204 is interpreted as being indicative that, in the period 206, the position and/or orientation of the terminal has significantly changed from what it was during the period 204. Based on this conclusion, it may be determined that the user engages more with (e.g., pays more attention to) what is displayed at the terminal during certain periods (e.g., period 206 when the user-selected content is being displayed) and engages less with (e.g., pays less attention to) what is displayed at the terminal during other periods (e.g., period 204 when advertisement content is being displayed).

Figure 2B:
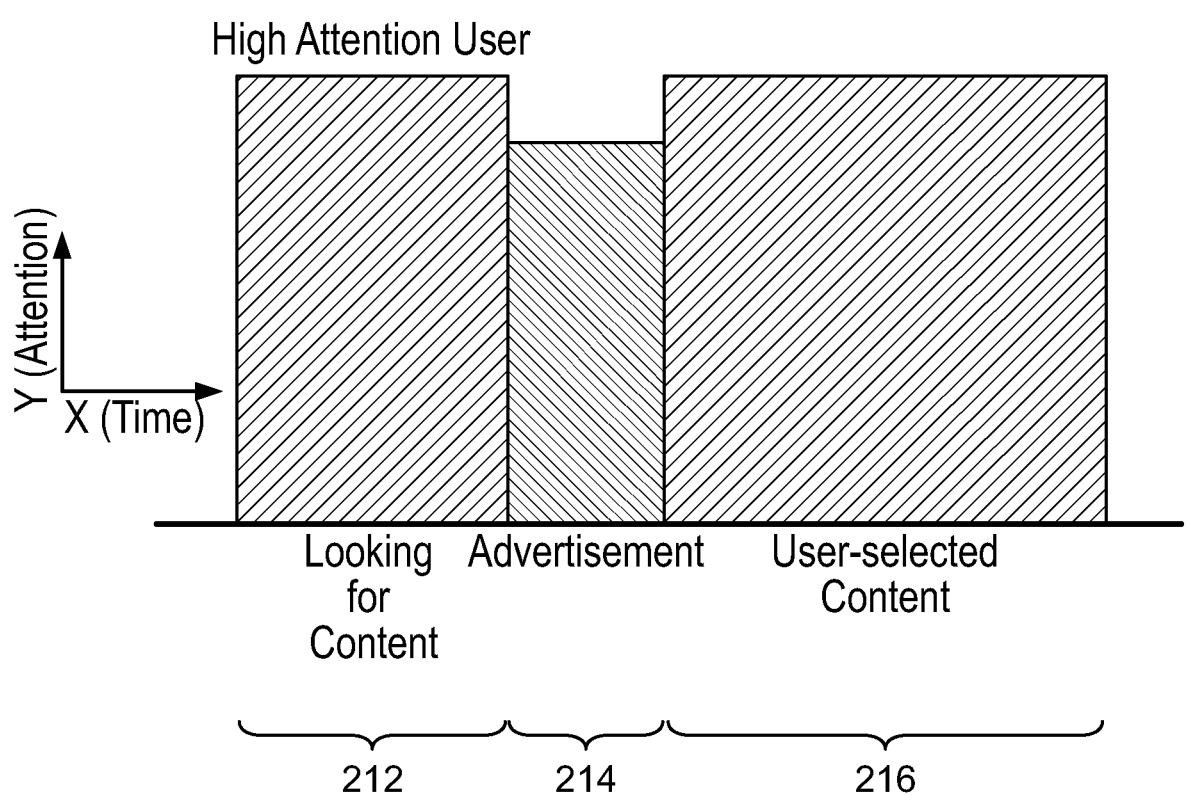

FIG. 2B illustrates behavioral characteristics of a second user who operates a terminal. The second user tends to engage at a higher degree with (e.g., pay more attention to) what is displayed at the terminal during certain periods (e.g., when the second user is actively searching for media content to select for display, when the user-selected content is being displayed, etc.). In addition, the second user may engage at a higher degree with (e.g., pay more attention to) what is displayed at the terminal during other periods, such as when content other than user-selected content (e.g., advertisement content) is being displayed.

With reference to the x-axis of FIG. 2B, three separate time periods are illustrated. During the period 212, the second user is actively searching for media content to select for display. Period 212 is followed by period 214. During the period 214, the terminal has not yet begun displaying content that was selected by the second user in the period 212. Rather, the terminal displays advertisement content. Period 214 is followed by period 216. During the period 216, the display of the advertisement content has ceased. The terminal displays the content that was selected by the second user.

With respect to the y-axis of FIG. 2B, average attention levels (e.g., averages of attention levels that are determined according to embodiments of this disclosure) are illustrated. As illustrated in FIG. 2B, the average attention levels do not significantly vary between the periods 212 and 214. Also, the average attention levels do not significantly vary between the periods 214 and 216. During the period 212, the attention levels have relatively high values (e.g., values higher than a particular threshold). As described earlier regarding the period 212, the second user is actively searching for media content to select for display. Accordingly, it may be determined that the attention levels have relatively high values correlating with the second user being engaged with what is displayed at the terminal.

During the period 214, the attention levels have somewhat lower values (e.g., with respect to the values of period 212). However, the values are not significantly lower. For example, the values may still be higher than a particular threshold. As described earlier regarding the period 214, the terminal displays advertisement content. Based, for example, on insignificant difference(s) in corresponding values of the sensor data, it may be determined that the positioning and/or orientation of the terminal has not significantly changed (e.g., from what it was during the period 212). Based on this conclusion, it may be determined that the attention levels have relatively high values correlating with the second user remaining engaged with what is displayed at the terminal.

During the period 216, the sensor data have somewhat higher values (e.g., with respect to the values of period 214). However, the values are not significantly higher. For example, the values may be higher than a particular threshold. As described earlier regarding the period 216, the terminal displays the content that was selected by the second user. Based, for example, on insignificant difference(s) in corresponding values of the sensor data, it may be determined that the positioning and/or orientation of the terminal has not significantly changed (e.g., from what it was during the period 214). Based on this conclusion, it may be determined that the attention levels have relatively high values correlating with the second user remaining engaged with what is displayed at the terminal.

According to various embodiments, an insignificant change (e.g., increase or decrease) in the values of the sensor data is interpreted as being indicative of an insignificant change in the positioning and/or orientation of the terminal, e.g., with respect to a user's line-of-sight. For example, the insignificant increase in the values of the sensor data during the period 216 relative to the values of the sensor data during the period 214 may be interpreted as being indicative that, in the period 216, the position and/or orientation of the terminal has not significantly changed from what it was during the period 214. Based on this conclusion, it may be determined that the user engages more with (e.g., pays more attention to) what is displayed at the terminal during certain periods (e.g., period 216 when the user-selected content is being displayed) and also engages more with (e.g., pays more attention to) what is displayed at the terminal during other periods (e.g., period 214 when advertisement content is being displayed).

As will be described in more detail later with reference to further embodiments, the determination regarding the tendency of a particular user may be used when selecting content that is to be provided to a terminal of the user.

As described earlier, sensor data measured by a terminal may be used to effectively determine a user's level of engagement with what is being displayed at the terminal (e.g., whether the user is paying a relatively high (or low) level of attention). Alternatively (or in addition), periodic polling may be used. For example, via the display of the terminal, the user may be asked to respond to certain questions regarding content that was presented at an earlier time. Responses provided by the user (or a lack thereof) may be used to determine the engagement level of the user. Although such an approach may facilitate collection of potentially useful information, at least some users might find such polling to be disruptive or otherwise unappealing. According to at least one embodiment, image sensor data measured by an image sensor of the terminal (e.g., the image sensor of a mobile telephone camera) is used. For example, the image sensor may be configured to output a relatively high value upon capturing a direct view of a face of a user, and to output a relatively low value in other situations (e.g., upon capturing an indirect or angled view of the face of the user, upon capturing a view that does not include the face of the user, etc.) As such, differences in the values of the image sensor data may be interpreted as being indicative of differences in the positioning and/or orientation of the terminal However, at least some users may find such use of image sensor data to be intrusive or otherwise unappealing. Also, in embodiments in which a content provider-specific application is used to select and display content, at least some users may not appreciate granting such an application access to image sensor data.

According to other embodiments of the present disclosure, sensor data other than image sensor data may be used.

For example, according to at least some embodiments, data sensed by an ambient light sensor of a terminal is used. When incorporated in a mobile device such as a mobile telephone, an ambient light sensor senses the amount of light in a surrounding environment (e.g., a room in which the device is located).

For example, when the mobile device is used in the daytime or in bright-light conditions, the ambient light sensor senses a relatively high amount of light, particularly when the device is pointed away from the line of sight of the user. Conversely, when the mobile device is used in the nighttime or in low-light conditions, the ambient light sensor senses a relatively low amount of light when pointed away from the user. Indeed, in low-light conditions, the backlight of the phone will illuminate the face of the user and reflect back onto the light sensor, resulting in a brighter ambient light sensor reading when the phone is directed at the user's face than when pointed away towards the dark environment.

According to various embodiments, a comparative positioning of a terminal is determined based on data measured by an ambient light sensor of the terminal. The data may be used to discern behavioral characteristics similar to characteristics that were described earlier with reference to FIGS. 2A and 2B. Examples of characteristics of the ambient light sensor data will now be described with reference to situations illustrated in FIGS. 3A and 3B.

With reference to FIG. 3A, a user 302 is located in a room brightly illuminated by an overhead light source 304. The user 302 is seated at a table 306, and is using a mobile device 308. The mobile device 308 includes an ambient light sensor that measures the amount of ambient light 310a.

As illustrated in FIG. 3A, the user 302 positions the display of the mobile device 308 in his direct view. For example, the user 302 positions the display directly in his line-of-sight 312a. This may occur when the user 302 is watching content that he had selected earlier (see, e.g., period 206 of FIG. 2A). In these conditions, the ambient light sensor of the mobile device 308 measures (or senses) the amount of ambient light 310a. As illustrated in FIG. 3A, the data output by the ambient light sensor, which may correspond to an average of two or more measurements, corresponds to a luminance of 30 lux.

At another time (e.g., at an earlier time), the display of the mobile device 308 is not positioned in direct view of the user 302. For example, as illustrated in FIG. 3B, the mobile device 308 rests on a surface of the table 306. As such, the display of the mobile device 308 is not positioned directly in the line-of-sight 312b of the user. As illustrated by way of example in FIG. 3B, the line-of-sight 312b leads to a point beyond the edge of the table 306. However, it is understood that the line-of-sight 312 may lead toward other directions and/or dimensions (e.g., a direction leading down into the page, a direction leading up out from the page, etc.).

The line-of-sight 312b may be different from the line-of-sight 312a, for example, because the user 302 does not care to engage with advertisement content being presented on the display (see, e.g., period 204 of FIG. 2A). In these conditions, the ambient light sensor of the mobile device 308 measures (or senses) the amount of ambient light 310b. As illustrated in FIG. 3B, the data output by the ambient light sensor, which may correspond to an average of two or more measurements, corresponds to a luminance of 210 lux.

The sensed luminance of FIG. 3B (210 lux) is significantly higher than the sensed luminance of FIG. 3A (30 lux) due to the change in the positioning of the mobile device 308. When the device 308 is positioned directly in front of the face of the user 302, the ambient light sensor of the device is offset with respect to the light source 304. Therefore, the amount of ambient light 310a sensed by the ambient light sensor is significantly lower than the amount of ambient light 310b that is sensed when the device 308 rests on the table 306 such that the ambient light sensor directly faces the light source 304.

Figure 4:
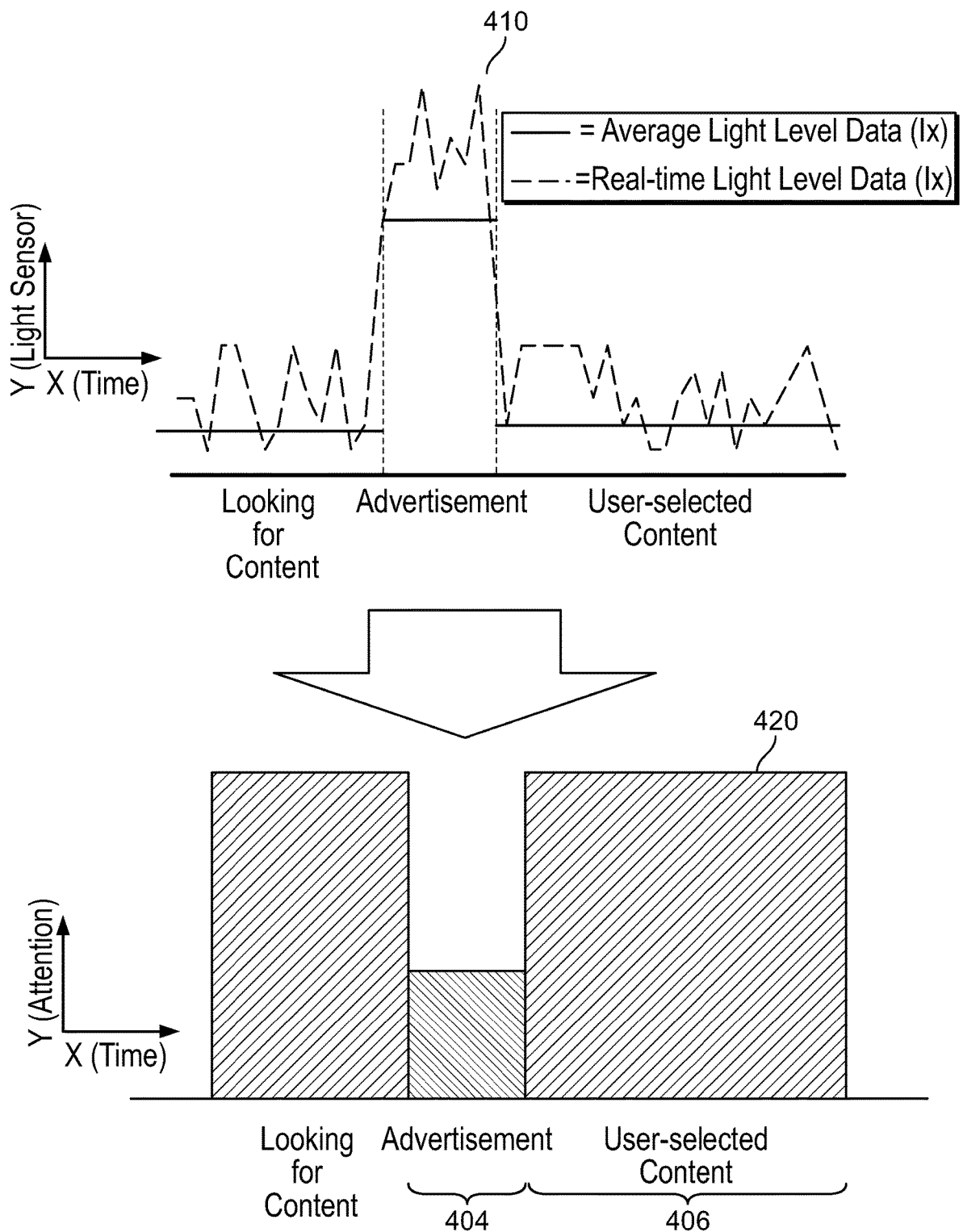
FIG. 4 illustrates characteristics of ambient light sensor data and corresponding engagement levels that are determined according to at least one embodiment.

FIG. 4 illustrates a plot 410 of ambient light sensor data and a corresponding plot 420 of engagement levels that are determined according to at least one embodiment. The plot 410 includes values such as those described earlier with reference to FIGS. 3A and 3B. For example, in period 406, the plot 410 includes values corresponding to 30 lux (see the situation illustrated in FIG. 3A), and, in period 404, the plot 410 includes values corresponding to 210 lux (see the situation illustrated in FIG. 3B).

A significant absolute difference (e.g., higher or lower) in the values of the sensor data is interpreted as being indicative of a change in the positioning and/or orientation of the mobile device 308, e.g., with respect to the line-of-sight of the user 302. For example, the significant decrease in the values of the ambient light sensor data in the period 406 relative to the values of the ambient light sensor data in the period 404 may be interpreted as being indicative that, in the period 406, the position and/or orientation of the mobile device 308 has changed from what it was during the period 404.

If it is known that a specific type of content (e.g., user-selected content) was presented at the mobile device 308 during the period 406 and that a different type of content (e.g., advertisement content) was presented at the mobile device during the period 404, then a determination regarding a comparative engagement level of the user with the different types of content may be made. For example, it may be determined that the user 302 engages more with (e.g., pays more attention to) what is displayed at the terminal during certain periods (e.g., period 406 when the user-selected content is being displayed) and engages less with (e.g., pays less attention to) what is displayed at the terminal during other periods (e.g., period 404 when advertisement content is being displayed). In this situation, the behavior of the user 302 is similar to that of the hypothetical user that was described earlier with reference to FIG. 2A.

FIG. 4 illustrates an inverse relationship between the sensed luminance and the determined engagement level. However, such an inverse relationship may not result in other situations. For example, an inverse relationship may not result in different environmental conditions. According to various embodiments, the relationship need not be one of an inverse type. Rather, an absolute difference(s) between the two states can be used to infer a difference in attention levels given the assumption that a user is paying attention to content that was selected by the user.

As described earlier with reference to FIGS. 3A and 3B, the room in which the mobile device 308 is located is brightly illuminated by the light source 304. In a less brightly lit environment (e.g., a dimly lit room), it is possible that a corresponding plot of the ambient light sensor will have a different shape compared to the shape of the plot 410 in FIG. 4. For example, in a dimly lit room, the luminance sensed by a mobile device (e.g., mobile device 308) may be higher when the display of the mobile device is positioned in the direct view of the user than when the mobile device is positioned elsewhere. This may be the case, for example, when the back-light from the mobile device 308 reflects off the user's face, off the user's glasses, or off other objects worn by the user when the mobile device 308 is in the user's line of sight.

According to embodiments of the present disclosure, significant differences in the values of the sensor data (e.g., ambient light sensor data) are interpreted as being indicative of a change in the positioning and/or orientation of the mobile device 308, e.g., with respect to the line-of-sight of the user 302. Furthermore, a determined change in the positioning may be interpreted as being indicative of a change in the engagement level. As such, whether a particular data value (or series of data values) is above or below a particular threshold—by itself—is not necessarily indicative of a particular engagement level.

According to various embodiments, data measured by an ambient light sensor may be used, as was described earlier with reference to FIGS. 3A, 3B and 4. However, it is understood that, according to other embodiments, other types of sensor data may be used in a similar manner.

For example, rotation vector data (or attitude data) may be used. The rotation vector of a mobile device may be determined based on information measured by one or more sensors (e.g., the accelerometer, magnetometer and/or gyroscope), and may be indicative of relative changes in the orientation of the mobile device. Significant differences in the values of the rotation vector data may be interpreted as being indicative of a change in the orientation of the mobile device, and, correspondingly, of a change in an engagement level of the user.

For example, rotation vector data may indicate a trend in which the mobile device is oriented at a particular angle when user-selected content is displayed and is oriented at a significantly different angle when advertisement content is displayed. In such a situation, it may be determined that the behavior of the user of the mobile device is similar to that of the user described earlier with reference to FIG. 2A.

Differences in the values of the sensor data (e.g., ambient light sensor data, rotation vector data) have been described with reference to various embodiments. According to one or more embodiments, the significance (if any) of such differences is determined based on statistical testing of the sensor data values. By way of example, a statistical t-test may be used to determine if two sets of sensor data values (e.g., sensor data measured when user-selected content is being displayed, and sensor data measured when advertisement content is being displayed) are significantly different from each other.

Particular sensor data values measured in some situations may be less reliable (or more noisy) than sensor data values measured in other situations. For example, a user may use the mobile device to view content at two or more different environments over the course of a given day (e.g., on a commuter bus during commuting hours on a weekday, at a regular location during lunch hour on a weekday, and at home during evening hours). Sensor data (e.g., ambient light sensor data, rotation vector data) that is measured while the user is located in a more dynamic environment (e.g., a moving commuter bus) may be less reliable than sensor data measured while the user is located in a more static environment (e.g., a regular lunch location, at home).

According to one or more embodiments, sensor data sets are segmented (or separated) to effectively filter out potentially noisy data. For example, sensor data sets may be segmented based on additional sensor data that is received along with the sensor data sets. The additional sensor data (e.g., data measured by a global positioning system (GPS) sensor, data measured by a Wi-Fi detection sensor) may provide geolocational information of the user's mobile device. For example, GPS sensor data may indicate that the location of the user is changing relatively rapidly, and the speed of travel may indicate that the user is on a commute. As another example, Wi-Fi detection sensor data may indicate the strengths of Wi-Fi signals provided by one or more Wi-Fi networks. As such, a location of the user (e.g., a relative location of the user) may be determined by, for example, performing a triangulation based on the Wi-Fi detection sensor data.

Alternatively (or in addition), the environment in which the user is located may be determined based on timestamp information indicating a time and/or day of the week at which the sensor data sets were measured.

According to one or more embodiments, sensor data sets are segmented (or separated) based on a location(s) at which the sensor data sets were measured. For example, sensor data sets measured while the user is located in a more dynamic environment (e.g., on a commuter bus) may be separated from sensor data sets measured while the user is located in a more static environment (e.g., a regular lunch location, at home). The separated sensor data sets may then be analyzed differently. For example, for reasons relating to data reliability and/or stability, static-environment sensor data sets may be favored over dynamic-environment sensor data sets when determining relative engagement levels. In an aspect, any number of ways for segmenting the data based on the categories described here may be possible.

As noted earlier, the determination(s) regarding the tendency of a particular user with respect to contents of different types may be used when selecting content that is to be provided to a terminal of the user. For example, if it is determined that the user engages with advertisement content at a level above a particular threshold, then it may be concluded that the user will tend to pay attention to advertisement content that is to be provided to his or her mobile device.

According to at least one embodiment, content that is to be provided to the mobile device of such a user is selected based on these determinations. For example, the content that is to be provided may include content (e.g., advertisement content) that requests some form(s) of interaction (e.g., manual interaction, voice interaction) by the user. By way of example, the advertisement content requesting the interaction(s) may include a click-to-install advertisement or a digital direct response advertisement. Such advertisement content may typically command higher rates (or prices). Targeting a user who has demonstrated a tendency to pay attention to advertisement content might serve to justify such higher rates. In an aspect, a user profile may be associated with the user, and an engagement value may be assigned to the user profile corresponding to the user. The engagement value may indicate whether the user exhibits high engagement levels (above a threshold) when viewing non-user selected content or low engagement levels (below a threshold) when viewing non-user selected content. Non-user selected content may include advertisements or content recommendations from the content provider. In this embodiment, additional non-user selected content may be selected for transmission to the user based on the user's engagement value.

More generally, the capability of a content provider to target such users could increase interest among advertisers. The ability to access an audience of such users may serve to justify higher advertising rates in general—that is, higher rates for advertisement content that may not necessarily include content that requests interaction(s) by the user.

As another example, if it is determined that the user engages with advertisement content at a level below a particular threshold, then it may be concluded that the user will tend not to pay attention to advertisement content that is to be provided to his mobile device.

According to at least one embodiment, content that is to be provided to the mobile device of a user with low engagement levels may be selected based on such a determination. For example, the content that is to be provided may exclude content (e.g., advertisement content) that requests some form(s) of interaction (e.g., manual interaction, voice interaction) by the user. As described earlier, the advertisement content requesting the interaction(s) may typically command higher rates. Targeting a user who has demonstrated a tendency not to pay attention to advertisement content might not serve to justify such higher rates.

According to least one embodiment, other forms of advertisement content may be provided to the mobile device of a user with lower engagement levels. For example, cost-per-thousand (CPM) advertising, which is purchased on the basis of impressions rather than interactions, may be provided to such a user. Alternatively (or in addition), the advertisement content provided to such a user may include content that features audio content to a stronger degree and features video (or image) content to a lesser degree. In this regard, it is appreciated that a user who tends not to watch advertisement content with his eyes may nevertheless be attracted to advertisement content that catches his ears.

For purposes of illustration, various embodiments have been described with respect to determining a comparative level of user engagement with advertisement content, in relation to non-advertisement content. However, it is understood that features of the described embodiments can be applied to determining a comparative level of user engagement between other types of content. For example, such features can be applied to determine a comparative level of user engagement with a portion of a specific piece of content (e.g., a first portion of non-advertisement content such as a movie) in relation to another portion of the content (e.g., at least a second portion of the same non-advertisement content). As such, it can be determined whether, for a particular user, the first portion attracts a stronger (or weaker) level of engagement than the second portion.

If the first portion attracts a stronger level of engagement and the first portion features particular elements (e.g., thematic elements, subject matter) not presented in the second portion, then this information may be input to a recommendation algorithm that recommends content that is to be provided to the particular user. In this manner, the content that is to be provided may be customized to include content that will likely attract a stronger level of engagement by the user. Such features may enhance the ability of content creators to create content that is likely to attract the attention of an audience of such users.

As another example, features that have been described with reference to various embodiment can be applied to determine a comparative level of user engagement with a specific portion of content (e.g., one or more pieces of content in a playlist) in relation to another portion of the content (e.g., one or more other pieces of content in the playlist). As such, it can be determined whether, for a particular user, a particular piece of content in a playlist attracts a stronger (or weaker) level of engagement than another piece of content in the playlist.

FIG. 5 illustrates a flowchart of a method 500 of determining a comparative level of user engagement according to at least one embodiment.

At block 502, sensor data is received from a mobile device (e.g., client terminal 106, mobile device 308). The sensor data may include first sensor data sensed by the mobile device during display of the content of a first type at the mobile device, and second sensor data sensed by the mobile device during display of content of a second type at the mobile device.

The received sensor data may exclude image sensor data of the mobile device.

The content of the first type may include advertisement content, and the content of the second type may include non-advertisement content.

The content of the first type may exclude non-advertisement content, and the content of the second type may exclude advertisement content.

The received sensor data of block 502 may also include third sensor data identifying geolocational information of the mobile device.

At block 504, the first sensor data may be segmented based on the third sensor data.

The first sensor data may be segmented based on the third sensor data and may be further segmented based on a time, day and/or speed of movement of the mobile device associated with the first sensor data.

At block 506, the second sensor data may be segmented based on the third sensor data.

The second sensor data may be segmented based on the third sensor data and may be further segmented based on a time, day and/or speed of movement of the mobile device associated with the second sensor data.

At block 508, a comparative level of user engagement with the content of the first type is determined based on the first sensor data and the second sensor data.

For example, as described earlier with reference to FIG. 4, engagement levels with advertisement content in relation to user-selected content are determined based on ambient light sensor data measured during display of advertisement content (see, e.g., FIG. 3B) and ambient light sensor data measured during display of user-selected content (see, e.g., FIG. 3A).

Determining the comparative level of user engagement (or engagement value) may be based on at least one segmented portion of the first sensor data (e.g., a segmented portion resulting from block 504) and at least one segmented portion of the second sensor data (e.g., a segmented portion resulting from block 506).

At block 510, additional content is selected based on the determined comparative level of user engagement The additional content may include advertisement content.

The additional content may include content requesting interaction by a user if the comparative level of user engagement with the content of the first type is determined to be higher than a particular threshold. For example, the content requesting interaction by the user may request at least one manual interaction or at least one voice interaction by the user during display of the content requesting interaction.

The additional content may exclude content requesting interaction by the user if the comparative level of user engagement with the content of the first type is determined to be lower than a particular threshold.

At block 512, the selected additional content is transmitted to the mobile device for display at the mobile device.

As previously described, in at least some embodiments, the client terminal, the encoder, the content server, the web servers, or other aspects of the described system (e.g., system 100 of FIG. 1) may include one or more software or hardware computer systems and may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

The components of various embodiments described herein may each include a hardware processor of the one or more computer systems, and, in one embodiment, a single processor may be configured to implement the various components. For example, in one embodiment, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 6:
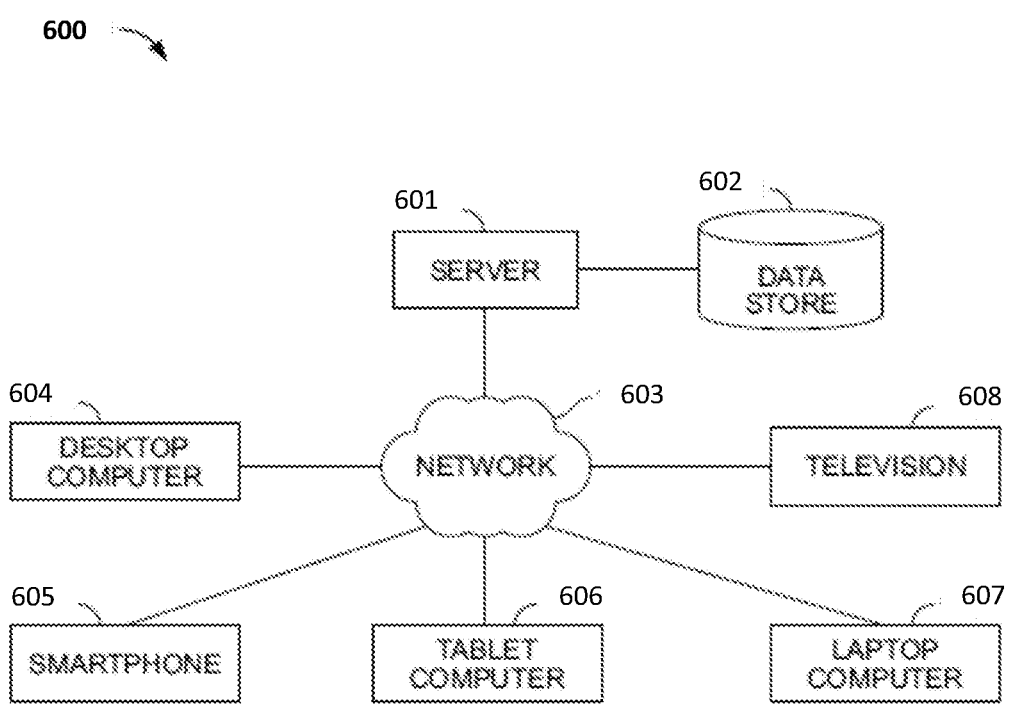
FIG. 6 is an illustration of a computing environment according to at least one embodiment.

In selected embodiments, features and aspects described herein may be implemented within a computing environment 600, as shown in FIG. 6, which may include one or more computer servers 601. The server 601 may be operatively coupled to one or more data stores 602 (e.g., databases, indexes, files, or other data structures). The server 601 may connect to a data communication network 603 including a local area network (LAN), a wide area network (WAN) (e.g., the Internet), a telephone network, a satellite or wireless communication network, or some combination of these or similar networks.

One or more client devices 604, 605, 606, 607, 608 may be in communication with the server 601, and a corresponding data store 602 via the data communication network 603. Such client devices 604, 605, 606, 607, 608 may include, for example, one or more laptop computers 607, desktop computers 604, smartphones and mobile phones 605, tablet computers 606, televisions 608, or combinations thereof. In operation, such client devices 604, 605, 606, 607, 608 may send and receive data or instructions to or from the server 601 in response to user input received from user input devices or other input. In response, the server 601 may serve data from the data store 602, alter data within the data store 602, add data to the data store 602, or the like, or combinations thereof.

In selected embodiments, the server 601 may transmit one or more media files including audio and/or video content, encoded data, generated data, and/or metadata from the data store 602 to one or more of the client devices 604, 605, 606, 607, 608 via the data communication network 603. The devices may output the audio and/or video content from the media file using a display screen, projector, or other display output device. In certain embodiments, the system 600 configured in accordance with features and aspects described herein may be configured to operate within or support a cloud computing environment. For example, a portion of, or all of, the data store 602 and server 601 may reside in a cloud server.

Figure 7:
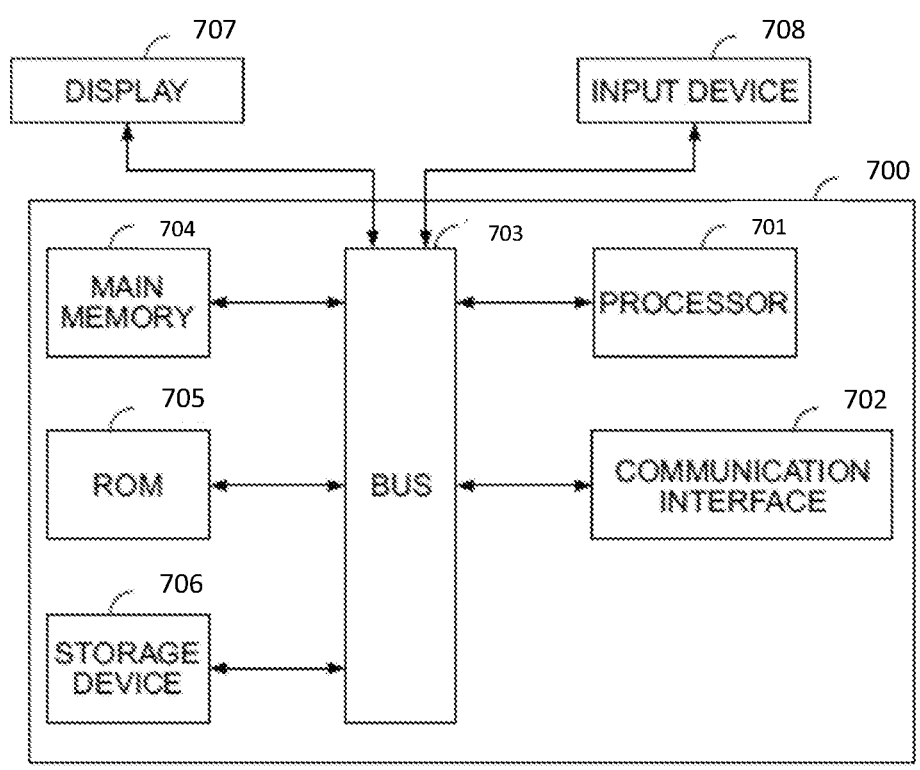
FIG. 7 is a block diagram of a device according to at least one embodiment.

With reference to FIG. 7, an illustration of an example computer 700 is provided. One or more of the devices 604, 605, 606, 607, 608 of the system 600 may be configured as or include such a computer 700. In addition, one or more components of the system 100 of FIG. 1 may be configured as or include the computer 700.

In selected embodiments, the computer 700 may include a bus 703 (or multiple buses) or other communication mechanism, a processor 701, main memory 704, read only memory (ROM) 705, one or more additional storage devices 706, and/or a communication interface 702, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 703 or other communication mechanism, including multiple such buses or mechanisms, may support communication of information within the computer 700. The processor 701 may be connected to the bus 703 and process information. In selected embodiments, the processor 701 may be a specialized or dedicated microprocessor configured to perform particular tasks in accordance with the features and aspects described herein by executing machine-readable software code defining the particular tasks. Main memory 704 (e.g., random access memory—or RAM—or other dynamic storage device) may be connected to the bus 703 and store information and instructions to be executed by the processor 701. Main memory 704 may also store temporary variables or other intermediate information during execution of such instructions.

ROM 705 or some other static storage device may be connected to a bus 703 and store static information and instructions for the processor 701. The additional storage device 706 (e.g., a magnetic disk, optical disk, memory card, or the like) may be connected to the bus 703. The main memory 704, ROM 705, and the additional storage device 706 may include a non-transitory computer-readable medium holding information, instructions, or some combination thereof—for example, instructions that, when executed by the processor 701, cause the computer 700 to perform one or more operations of a method as described herein. The communication interface 702 may also be connected to the bus 703. A communication interface 702 may provide or support two-way data communication between the computer 700 and one or more external devices (e.g., other devices contained within the computing environment).

In selected embodiments, the computer 700 may be connected (e.g., via the bus 703) to a display 707. The display 707 may use any suitable mechanism to communicate information to a user of a computer 700. For example, the display 707 may include or utilize a liquid crystal display (LCD), light emitting diode (LED) display, projector, or other display device to present information to a user of the computer 700 in a visual display. One or more input devices 708 (e.g., an alphanumeric keyboard, mouse, microphone) may be connected to the bus 703 to communicate information and commands to the computer 700. In selected embodiments, one input device 708 may provide or support control over the positioning of a cursor to allow for selection and execution of various objects, files, programs, and the like provided by the computer 700 and displayed by the display 707.

The computer 700 may be used to transmit, receive, decode, display, etc. one or more video files. In selected embodiments, such transmitting, receiving, decoding, and displaying may be in response to the processor 701 executing one or more sequences of one or more instructions contained in main memory 704. Such instructions may be read into main memory 704 from another non-transitory computer-readable medium (e.g., a storage device).

Execution of sequences of instructions contained in main memory 704 may cause the processor 701 to perform one or more of the procedures or steps described herein. In selected embodiments, one or more processors in a multi-processing arrangement may also be employed to execute sequences of instructions contained in main memory 704. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 701, or that stores data for processing by a computer, and include all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 702 may provide or support external, two-way data communication to or via a network link. For example, the communication interface 702 may be a wireless network interface controller or a cellular radio providing a data communication network connection. Alternatively, the communication interface 702 may include a LAN card providing a data communication connection to a compatible LAN. In any such embodiment, the communication interface 702 may send and receive electrical, electromagnetic, or optical signals conveying information.

A network link may provide data communication through one or more networks to other data devices (e.g., client devices as shown in the computing environment 600). For example, a network link may provide a connection through a local network of a host computer or to data equipment operated by an Internet Service Provider (ISP). An ISP may, in turn, provide data communication services through the Internet. Accordingly, a computer 700 may send and receive commands, data, or combinations thereof, including program code, through one or more networks, a network link, and communication interface 702. Thus, the computer 700 may interface or otherwise communicate with a remote server (e.g., server 601), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of determining a comparative level of user engagement with content of a first type, the method comprising:
   receiving sensor data from a mobile device,
   wherein the sensor data comprises:
   first sensor data sensed by the mobile device during display of the content of the first type at the mobile device, the first sensor data comprising a first position of the mobile device and a first ambient light sensor data sensed by the mobile device during the display of the content of the first type; and
   second sensor data sensed by the mobile device during display of content of a second type at the mobile device, the second sensor data comprising a second position of the mobile device and a second ambient light sensor data sensed by the mobile device during the display of the content of the second type; and
   without using image sensor data of the mobile device, determining the comparative level of user engagement with the content of the first type by comparing the first position of the mobile device and the first ambient light sensor data as sensed during the display of the content of the first type and the second position of the mobile device and the second ambient light sensor data as sensed during the display of the content of the second type,
   wherein determining the comparative level of user engagement comprises interpreting a difference between the first ambient light sensor data and the second ambient light sensor data as being indicative of a change in at least a positioning or an orientation of the mobile device with respect to a line-of-sight of a user of the mobile device;
   selecting additional content based on the determined comparative level of user engagement; and
   transmitting the selected additional content to the mobile device for output by the mobile device.

2. The method of claim 1, wherein the received sensor data excludes image sensor data of the mobile device.

3. The method of claim 1, wherein:
the content of the first type comprises advertisement content;
the content of the second type comprises non-advertisement content; and
the additional content comprises advertisement content.

4. The method of claim 3, wherein:
the content of the first type excludes non-advertisement content; and
the content of the second type excludes advertisement content.

5. The method of claim 1, wherein:
the first sensor data further comprises at least rotational vector data or attitude data sensed by the mobile device during the display of the content of the first type; and
the second sensor data further comprises at least rotational vector data or attitude data sensed by the mobile device during the display of the content of the second type.

6. The method of claim 5, wherein:
the received sensor data further comprises third sensor data identifying geolocational information of the mobile device; and
the method further comprises:
segmenting the first sensor data based on the third sensor data; and
segmenting the second sensor data based on the third sensor data.

7. The method of claim 6, wherein determining the comparative level of user engagement comprises determining the comparative level of user engagement based on at least one segmented portion of the first sensor data and at least one segmented portion of the second sensor data.

8. The method of claim 6, wherein:
segmenting the first sensor data comprises segmenting the first sensor data based on the third sensor data and further based on at least one of a time, day, or speed of movement associated with the first sensor data; or
segmenting the second sensor data comprises segmenting the second sensor data based on the third sensor data and further based on at least one of a time, day, or speed of movement associated with the second sensor data.

9. The method of claim 1, wherein selecting the additional content comprises selecting the additional content to include content requesting interaction by the user if the comparative level of user engagement with the content of the first type is determined to be above a particular threshold.

10. The method of claim 9, wherein the content requesting interaction by the user requests at least one manual interaction by the user or at least one voice interaction by the user during display of the content requesting interaction.

11. The method of claim 9, wherein selecting the additional content further comprises selecting the additional content to exclude content requesting interaction by the user if the comparative level of user engagement with the content of the first type is determined to be below a particular threshold.

12. The method of claim 1, wherein determining the comparative level of user engagement comprises determining an increase or a decrease in a level of user engagement based on a difference in an amount of light as indicated by the first ambient light sensor data and by the second ambient light sensor data.

13. A content server for determining a comparative level of user engagement with content of a first type, the content server comprising:
a network communication unit configured to transmit and receive data; and
one or more controllers configured to:
control the network communication unit to receive sensor data from a mobile device,
wherein the sensor data comprises:
first sensor data sensed by the mobile device during display of the content of the first type at the mobile device, the first sensor data comprising a first position of the mobile device and a first ambient light sensor data sensed by the mobile device during the display of the content of the first type; and
second sensor data sensed by the mobile device during display of content of a second type at the mobile device, the second sensor data comprising a second position of the mobile device and a second ambient light sensor data sensed by the mobile device during the display of the content of the second type; and
without using image sensor data of the mobile device, determine the comparative level of user engagement with the content of the first type by comparing the first position of the mobile device and the first ambient light sensor data as sensed during the display of the content of the first type and the second position of the mobile device and the second ambient light sensor data as sensed during the display of the content of the second type,
wherein the comparative level of user engagement is determined by interpreting a difference between the first ambient light sensor data and the second ambient light sensor data as being indicative of a change in at least a positioning or an orientation of the mobile device with respect to a line-of-sight of a user of the mobile device;
select additional content of the first type based on the determined comparative level of user engagement; and
control the network communication unit to transmit the selected additional content of the first type to the mobile device for output by the mobile device.

14. The content server of claim 13, wherein the received sensor data excludes image sensor data of the mobile device.

15. The content server of claim 13, wherein:
the content of the first type comprises advertisement content;
the content of the second type comprises non-advertisement content; and
the additional content comprises advertisement content.

16. The content server of claim 15, wherein:
the content of the first type excludes non-advertisement content; and
the content of the second type excludes advertisement content.

17. The content server of claim 13, wherein:
the first sensor data further comprises at least rotational vector data or attitude data sensed by the mobile device during the display of the content of the first type; and
the second sensor data further comprises at least rotational vector data or attitude data sensed by the mobile device during the display of the content of the second type.

18. The content server of claim 13, wherein:
the one or more controllers select the additional content by selecting the additional content to include content requesting interaction by the user if the comparative level of user engagement with the content of the first type is determined to be above a particular threshold; and
the content requesting interaction by the user requests at least one manual interaction by the user or at least one voice interaction by the user during display of the content requesting interaction.

19. The content server of claim 18, wherein the one or more controllers select the additional content further by selecting the additional content to exclude content requesting interaction by the user if the comparative level of user engagement with the content of the first type is determined to be below a particular threshold.

* * * * *